United States Patent [19]

Yeakey et al.

[11] 4,393,237

[45] Jul. 12, 1983

[54] POLYOXYALKYLENEPOLYACRYLAMIDES

[75] Inventors: Ernest L. Yeakey, Houston; Lewis W. Watts, Jr., Austin, both of Tex.

[73] Assignee: Texaco Inc., White Plains, N.Y.

[21] Appl. No.: 279,906

[22] Filed: Jul. 2, 1981

[51] Int. Cl.$^3$ ........................................... C07C 103/153
[52] U.S. Cl. .................................... 564/153; 564/159; 564/208
[58] Field of Search ................ 564/182, 208, 153, 159

[56] References Cited

U.S. PATENT DOCUMENTS

| | | | |
|---|---|---|---|
| 3,037,056 | 5/1962 | Lowe et al. | 564/208 |
| 3,470,079 | 9/1969 | D'Alelio | 564/153 X |
| 3,483,104 | 12/1969 | D'Alelio | 564/153 X |
| 3,776,956 | 12/1973 | Yamane et al. | 564/208 X |
| 3,878,247 | 4/1975 | Moss et al. | 260/561 N |
| 3,971,765 | 7/1976 | Green et al. | 260/78 A |
| 4,031,138 | 6/1977 | Nieh et al. | 260/561 N |
| 4,134,916 | 1/1979 | Moss et al. | 260/561 N |
| 4,172,935 | 10/1979 | Hermans | 528/27 |
| 4,228,102 | 10/1980 | Besecke et al. | 564/208 X |
| 4,301,083 | 11/1981 | Yoshimura et al. | 564/208 X |

FOREIGN PATENT DOCUMENTS 47-16289  5/1972  Japan ................................. 564/208

OTHER PUBLICATIONS

"Anaerobic and Cyanoacrylate Adhesives, Technology and Applications" by Bruce Murray at Adhesives for Industry Conference, Mar. 11, 1976.
"A Case of Commerical Development: Loctite" by Newman Giragosian, Chemtech, Oct. 1980, pp. 604–609.
Hard Loc for Bonding Structural Parts, Chemical Economy and Engineering Review, Sep. 1976, pp. 31–35 by Masao Harada.

*Primary Examiner*—Thomas A. Waltz
*Attorney, Agent, or Firm*—Carl G. Ries; Jack H. Park; Harold J. Delhommer

[57] ABSTRACT

Novel polyoxyalkylenepolyacrylamide compounds useful as adhesives are disclosed. These novel compounds are prepared by mixing and reacting di- and tri-functional polyoxyalkylenepolyamines with an acrylate such as methacrylic acid or methylmethacrylate at an elevated temperature and pressure.

3 Claims, No Drawings

POLYOXYALKYLENEPOLYACRYLAMIDES

TECHNICAL FIELD OF THE INVENTION

The present invention relates to novel polyoxyalkylenepolyacrylamide compounds useful as anaerobically-curing adhesives and the preparation of such compounds. In particular, it deals with the production of polyoxyalkylenepolyacrylamides from the reaction of a polyoxyalkylenepolyamine with methylmethacrylate or methacrylic acid.

PRIOR ART

Anaerobic adhesives are used principally to bond aluminum and steel in airless spaces such as between bolt threads. Acrylate esters such as the adhesive sold under the trademark Loctite and cyanoacrylates are anaerobic adhesives used for these purposes. Various compounds have been employed in the past to cure adhesives, both aerobically and anaerobically. However, the cost of production as well as the tendency of acrylate esters to deteriorate in the presence of water are drawbacks to their use.

An article entitled "Hard Loc for Bonding Structural Parts" in the Chemical Economy and Engineering Review of September, 1976, Page 31, discusses adhesives and discloses several acrylate compounds as anaerobic adhesives, including, cyanoacrylate and tetraethyleneglycol dimethacrylate. The reference goes on to discuss a two-component *aerobic* adhesive, whose structure or preparation is not disclosed.

A paper entitled "Anaerobic and Cyanoacrylate Adhesives, Technology and Applications" by Bruce Murray of Loctite Corp. presented at the Adhesives for Industry Conference in El Segundo, Calif. on Mar. 11, 1976 gives a detailed discussion of the properties and limitations of anaerobic and cyanoacrylate adhesives but fails to discuss the method of preparation of the adhesives or disclose the claimed polyacrylamides. To the same effect is a second article published in *Chemtech*, October 1980, p. 604–9, by Newman Giragosian, entitled "A Case of Commercial Development: Loctite". Both articles touch on the subjects of anaerobic adhesives and cyanoacrylates, but ignore acrylamides.

Although U.S. Pat. Nos. 3,878,247; 4,031,138 and 4,134,916 discuss acrylamide adhesives, none of the references disclose the structure of the present invention. Additionally, the aminoalkylacrylamides of U.S. Pat. Nos. 3,878,247 and 4,031,138 are derived from predominately straight chain mono amines and not the di- or tri-functional polyamines of the instant invention.

In U.S. Pat. No. 4,134,916, the monoamine groups are totally reacted in contrast to the instant acrylamides which have free ammonia groups remaining despite the use of excess reactants. Azeotropic agents are also employed to remove water during the reaction to form the acrylamides of U.S. Pat. No. 4,134,916.

SUMMARY OF THE INVENTION

The present invention is comprised of novel polyoxyalkylenepolyacrylamide compounds and the method of producing such compounds for use primarily as an anaerobic adhesive. The adhesive polyoxyalkylenepolyacrylamide compounds are prepared by mixing and reacting a polyoxyalkylenepolyamine with an acrylate at an elevated temperature and pressure. More particularly, di- and tri-functional polyoxyalkylenepolyamines are reacted with the acrylate at about 150° C. to about 300° C. for one to two hours. The preferred reactants used are di- or tri-functional polyoxypropylenepolyamines and methylmethacrylate or methylacrylic acid. Surprisingly, no catalyst is needed to affect the reaction.

DETAILED DESCRIPTION

The present invention concerns novel polyoxyalkylenepolyacrylamide compounds prepared by mixing and reacting a polyoxyalkylenepolyamine with an acrylate at an elevated temperature and pressure. These polyoxyalkylenepolyacrylamides are represented by the general formula

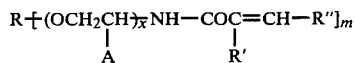

wherein R is the reaction product of an alkylene oxide and an oxyalkylation-susceptible aliphatic polyhydric alcohol having from 2 to 8 carbon atoms and a functionality of 2 to about 6, R' is hydrogen or lower alkyl group having from 1 to 4 carbon atoms, R" is hydrogen or lower alkyl group having 1 to 4 carbon atoms or phenyl group, A is hydrogen or a methyl or ethyl group, x has an average value of about 2–40 and m is 2 to about 6. Oxyalkylation-susceptible refers to a compound having a labile hydrogen atom such as a compound with a hydroxy group or amino group.

Outstanding anaerobic adhesive properties are provided by these compounds which are quite useful alone as an anaerobic adhesive or as a curing agent or additive for other adhesive compositions. The instant compounds also provide significant advantages over present anaerobic adhesives such as acrylate esters. The instant polyoxyalkylenepolyacrylamides should have greater bonding strength than acrylate esters. The increased bonding strength translates to a greater water resistance and stability, a considerable advantage in humid climates or where water contact is possible. Sheets of metal or other materials can easily be bonded together by spreading a film of one of the polyoxyalkylenepolyacrylamide compounds of this invention on the metallic surfaces and pressing the surfaces together thereby excluding air.

Preferably, di-, tri-, or tetra-functional polyoxyalkyleneamines are reacted with an acrylate to yield the compounds of this invention. The especially preferred polyoxyalkylenepolyamines are di- or tri-functional polyoxypropylenepolyamines of the following general formula:

where X has an average value ranging from 2 to 40 and a molecular weight of about 200 to about 2500, and

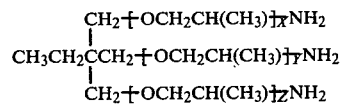

where X+Y+Z has an average value of 3 to 30 and a molecular weight of about 250 to about 2000.

The preferred oxyalkylation-susceptible aliphatic polyhydric alcohols from which the polyalkoxyamines are prepared are those having a functionality of 2 or 3, but polyhydric alcohols with a functionality of 4, 5 or 6 may also be used. The compounds are prepared by alkoxylating such polyhydric alcohols with at least one mole of, preferably, propylene oxide for each hydroxyl group present on the alcohol. Preferred oxyalkylation-susceptible polyhydric alcohols are alkylene glycols, such as ethylene glycol, 1,2-propylene glycol and 1,2-butylene glycol, glycerine, trimethylolpropane, or sorbitol.

The alkoxylation reaction is conducted by those methods well known to those skilled in the art by reacting the polyhydric alcohol with propylene oxide or ethylene oxide or a mixture of these, preferably propylene oxide in the presence of an acid or alkali catalyst, usually an alkaline material such as potassium hydroxide, for example. After the reaction is concluded, the alkaline catalyst is neutralized with an acid and the product recovered.

The alkoxylated polyhydric alcohols are reacted with ammonia, usually in the presence of hydrogen, using a known method of ammonolysis such as, for example, that described in U.S. Pat. No. 3,654,370, wherein the propylene oxide adduct of a polyhydric alcohol is reacted with ammonia in the presence of a hydrogenation-dehydrogenation catalyst to form polyether diamines and higher amines. The preferable catalyst for the ammonolysis will be one containing nickel, copper and chromium as described, for example, in U.S. Pat. No. 3,152,998. This catalyst is generally prepared by the reduction of a mixture of the oxides of nickel, copper and chromium in the presence of hydrogen at a temperature within the range of about 250° to 400° C. Calculated on an oxide-free basis, the catalyst contains from 60 to 85 mole percent nickel, 14 to 37 mole percent copper and 1 to 5 mole percent chromium. A particularly preferred catalyst composition is one containing 70 to 80 mole percent nickel, 20 to 25 mole percent copper and 1 to 5 mole percent chromium.

The ammonolysis reaction is generally conducted at a temperature of from about 100° C. to about 300° C. and a pressure of about 500 to 5000 psig created at least in part by the pressure of hydrogen introduced into the reaction vessel. Ammonia is introduced into the reaction such that there is a minimum of one mole of ammonia per hydroxyl group. The reaction can be conducted either as a batch or continuous reaction. Other methods of ammonolysis known to those of ordinary skill in the art can, of course, be used.

The acrylates reacted with the polyoxyalkylenepolyamines are of the general formula

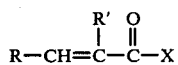

where X is halo, OH or OR" where R" is a lower alkyl group having one to four carbon atoms or a phenyl group and R and R' are hydrogen or a lower alkyl group having from one to four carbon atoms. Methylmethacrylate and methacrylic acid are the preferred acrylate reactants.

The mole ratio of methylmethacrylate or methacrylic acid to polyoxyalkylenepolyamine in the reaction may range from 1:1 to as much as 10:1. But preferably, the molar ratio will be within the range of about 1.5:1 to about 3.0:1. It was surprisingly found that the reaction would go forward at a sufficient speed without the addition of catalysts. Reaction speed increases and the concentration of unsaturates in the polyoxyalkylenepolyacrylamide product decreases when a large excess of methylmethacrylate or methacrylic acid is used.

An oxidation inhibitor, preferably, N, N' dimethylphenylenediamine, is used in the preferred embodiment of the invention. Approximately 0.0005 to about 0.005 moles of N,N' dimethyl-p-phenylenediamine is used per mole of polyoxyalkylenepolyamine in the reaction. Other inhibitors that may be used are: N,N-diphenyl-p-phenylenediamine, paraphenylenediamine, diphenylenediamine, tetramethylphenylenediamine, bisoctophenylenediamine, 2-mercaptobenzothiazole, hydroquinone, paramethoxyphenol and di-t-butyl-p-cresol.

The reactants are heated to about 150° to about 300° C., preferably 250° C., over one to two hours in a pressure controlled vessel. The pressure will normally rise to approximately 300 to 400 psig at the end of the reaction time.

The crude reaction product, which is normally a viscous straw liquid or gel, is treated with a solvent for handling convenience and filtered. The added solvent is then stripped out under reduced pressure yielding the polyoxyalkylenepolyacrylamide. The finished reaction product will usually have about one to about 1.5 moles of unsaturates per mole of reactant and anywhere from 2 to 10% nitrogen. Molecular weight will, of course, vary according to the molecular weight of the polyoxyalkylenepolyamines employed as a reactant. IR and NMR analysis has revealed that the polyoxyalkylenepolyacrylamide formed is normally a mixture of the mono-adduct and di-adduct when a tri-functional polyoxypropylenepolyamine is employed. Even when an excess of the methylmethacrylate or methacrylic acid is added above the number of reactive amine sites, some unreacted amine results.

Using the tri-functional polyamine as an example, a product compound of the following formula results:

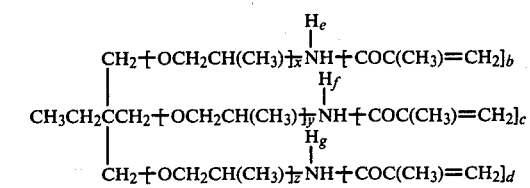

wherein x+y+z has an average value of 3 to 30; b, c, d are 0 or 1; provided, if b=0, e is 1 and conversely e is 0 if b=1; if c=0, f is 1 and conversely f is 0 if c=1; if d=0, g is 1 and conversely g is 0 if d=1; provided, further, at least one of b, c and d must be 1.

The following examples will further illustrate the polyoxyalkylenepolyacrylamides prepared according to the present invention. They are given by way of illustration and not as limitations on the scope of the invention. Thus, it will be understood that reactants, proportions of reactions, and time, temperature and pressure of the reaction steps may be varied with much the same results achieved.

EXAMPLES

EXAMPLE 1

100 grams (0.24 moles) of a tri-functional polyoxypropylenepolyamine (sold under the Trademark Jeffamine T-403 by Texaco Chemical Company) having the general formula

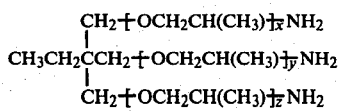

where x+y+z is approximately equal to 5.3 were mixed and reacted with 60 grams (0.6 moles) of methylmethacrylate in the presence of 0.05 grams N,N' dimethyl-p-phenylenediamine. After flushing the reactor with nitrogen, the mixture was heated for two hours at 250° C. Pressure reached a maximum of 358 psig after two hours. The crude product was treated with a solvent for handling convenience and filtered. The added solvent was then stripped under reduced pressure to yield the reaction product, polyoxypropylenepolyacrylamide. Analysis of the resulting product (see Table 1) indicated that there were 1.3 moles of unsaturates per mole of reactant.

Molecular weight of the product was about 500 with 5.7% nitrogen in the product. It was surmised that the product is a mixture of the mono-adduct and the di-adduct. Theoretical analysis indicates that if the product was 100% monoadduct that the molecular weight would be 471 and the percent of nitrogen 8.9%. The di-adduct molecules should theoretically weigh about 540 with 7.8% nitrogen. Actual analysis by IR and NMR indicates that the polyoxypropylenepolyacrylamide produced was most likely a mixture of both the mono-adduct and the di-adduct.

EXAMPLE 2

The same quantities of tri-functional polyoxypropylenepolyamine and methylmethacrylate of Example 1 were added to an autoclave in the presence of N,N' dimethyl-p-phenylenediamine. In this run the reaction temperature of 250° C. was maintained for only one hour. Maximum pressure after the one hour was 300 psig. The amount of unsaturates present within the product after this shorter reaction time indicates that the reaction did not progress as far as it did in Example 1. The results of this preparation are detailed in Table I.

EXAMPLE 3

The tri-functional polyoxypropylenepolyamine sold under the Trademark Jeffamine T-403 was employed again, but this time the second reactant was methacrylic acid instead of methylmethacrylate. 302 grams (0.75 moles) of the polyamine were mixed with 131.5 grams (1.53 moles) of methacrylic acid and 0.05 grams of N,N' dimethyl-p-phenylenediamine for two hours at 252° C. The quantity of unsaturates indicates a much more complete reaction than Examples 1 or 2 with the details of product analysis shown on Table I.

EXAMPLES 4–7

To the stirred autoclave was charged, in each case, 333 grams (0.83 moles) of the same tri-functional polyamine used in the previous examples and 205 grams (2.03 moles) of methylmethacrylate with 0.25 grams of N,N' dimethyl-p-phenylenediamine, the inhibitor. Reaction time in each case was one hour at a temperature of 250° to 253° C. The extent of reaction and percent nitrogen indicated that the structures of the polyoxypropylenepolyacrylamides were nearly identical. See Table I.

EXAMPLE 8

333 grams (0.82 moles) of the tri-functional polyamine were added to the stirred autoclave along with 307 grams (3.1 moles) of methylmethacrylate to yield a large molar ratio of 3.8 moles methylmethacrylate to 1 mole polyamine in the presence of 0.3 grams of the inhibitor used in the previous examples. After one hour of reaction the vessel pressure was considerably higher than the previous examples and the percent nitrogen in the final product was lower as shown on Table I.

EXAMPLE 9

Example 8 was repeated with a much lower molar ratio (1.26:1) of 103 grams of methylmethacrylate to 333 grams of the tri-functional polyamine added to the vessel in the presence of 0.3 grams of N,N' dimethyl-p-phenylenediamine. After the same time and temperature as Example 8, one hour at 250° C., the vessel pressure was considerably lower with the product containing a much higher percentage of nitrogen.

EXAMPLE 10

333 grams (0.33 moles) of a tri-functional polyoxypropyleneamine sold under the Trademark Jeffamine T-1003 having the general formula of

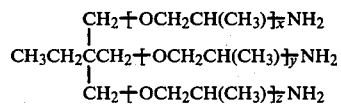

where x+y+z is approximately equal to 15 and having a molecular weight of about 1,000 were added to 82 grams (0.81 moles) of methylmethacrylate and 0.25 grams of N,N' dimethyl-p-phenylenediamine inhibitor in the autoclave. Reaction at 252° C. for one hour resulted in a low pressure of 188 psig in the autoclave and a much lower percent nitrogen (2.5) than in any of the previous examples.

EXAMPLE 11

333 grams (0.47 moles) of polyoxypropylenepolyamine sold under the Trademark Jeffamine T-703, having the same general formula as Example 10 with x+y+z approximately equal to 10 and a molecular weight of about 700 were added to 117 grams (1.2 moles) of methylmethacrylate and 0.25 grams of inhibitor, N,N' dimethyl-p-phenylenediamine. Product analysis indicated a more incomplete reaction than the previous examples after this mixture was heated for one hour at only 150° C.

EXAMPLE 12

A mixture of methylmethacrylate (60 grams, 0.6 moles), a di-functional polyoxypropylenepolyamine sold under the Trademark Jeffamine D-400 of the general formula

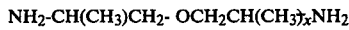

where x equals approximately 5.6, having a molecular weight of about 400 (120 grams, 0.3 moles) and N,N' dimethyl-p-phenylenediamine (0.1 grams) was heated at 250° C. for two hours in an autoclave. The final product exhibited an amine content of 1.2 milliequivalents per gram compared with 3.3 milliequivalents per gram amine for the starting material.

The results of analyses and data of the product made in the above examples are described in the following Table I.

TABLE 1

| Example | Reactants; gms, moles I | II | Molar ratio 1:II | Inhibitor gms, moles III[a] | Molar ratio 1:III | Reaction Time, hrs | Temp, C.° | Pressure, max., psig | Unsaturates moles/mole reactant[b] | Percent nitrogen |
|---|---|---|---|---|---|---|---|---|---|---|
| 1 | JEFFAMINE T-403 100; 0.24 | Methyl- methacrylate 60; 0.60 | 1:2.5 | 0.05; .00037 | 1:.0015 | 2.0 | 250 | 358 after 2 hrs | 1.3:1 | 5.7 |
| 2 | JEFFAMINE T-403 100; 0.24 | Methyl- methacrylate 60; 0.60 | 1:2.5 | 0.05; .00037 | 1:.0015 | 1.0 | 250 | 300 | 1.5:1 | |
| 3 | JEFFAMINE T-403 302; 0.75 | Methacrylic acid 13/.5; 1.53 | 1:2.0 | 0.05; .00037 | 1:.00049 | 2.0 | 252 | 160 after ~1 hr. | 1:1 | 6.7 |
| 4 | JEFFAMINE T-403 333; 0.83 | Methyl- methacrylate 205; 2.03 | 1:2.4 | 0.25; .0018 | 1:.0022 | 1.0 | 251 | 375 | | 5.8 |
| 5 | JEFFAMINE T-403 333; 0.83 | Methyl- methacrylate 205; 2.03 | 1:2.4 | " | " | 1.0 | 253 | 393 | ~1:1 | 5.9 |
| 6 | JEFFAMINE T-403 333; 0.83 | Methyl- methacrylate 205; 2.03 | 1:2.4 | " | " | 1.0 | 252 | 355 | ~1:1 | |
| 7 | JEFFAMINE T-403 333; 0.83 | Methyl- methacrylate 205; 2.03 | 1:2.4 | " | " | 1.0 | 252 | 379 | ~1:1 | 6.1 |
| 8 | JEFFAMINE T-403 333; 0.83 | Methyl- methacrylate 307; 3.1 | 1:3.8 | 0.3; .0022 | 1:.0027 | 1.0 | 250 | 470 | Yes | 5.1 |
| 9 | JEFFAMINE T-403 333; 0.83 | Methyl- methacrylate 103; 1.03 | 1:1.26 | " | 1:.0027 | 1.0 | 252 | 230 | Yes | 7.4 |
| 10 | JEFFAMINE T-1003 333; 0.33 | Methyl- methacrylate 82; 0.81 | 1:2.45 | 0.25; .0018 | 1:.0055 | 1.0 | 252 | 188 | ~1:1 | 2.5 |
| 11 | JEFFAMINE T-703 333; 0.47 | Methyl- methacrylate 117; 1.2 | 1:2.6 | 0.25; .0018 | 1:.0038 | 1.0 | 151 | 233 | 1.4:1 | 4.2 |
| 12 | JEFFAMINE D-400 120; 0.3 | Methyl- methacrylate 60; 0.6 | 1:2.0 | 0.1; .00073 | 1:.0024 | 2.0 | 250 | | | |

[a]N,N'—dimethyl-p-phenylenediamine.
[b]Basis NMR analysis of stirred product

The novel polyoxyalkylacrylamides disclosed herein can be produced by varying the basic reactants over wide limits. Many variations of the method of this invention will be apparent to those skilled in the art from the foregoing discussion and examples. Variations can be made without departing from the scope and spirit of the following claims.

We claim:

2. A compound according to claim 1 of the formula

CH$_2$=(CH$_3$)COC—NHCH(CH$_3$)CH$_2$[OCH$_2$CH(CH$_3$)]$_x$NH—COC(CH$_3$)=CH$_2$

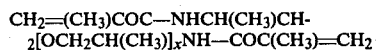

wherein x has an average value of about 2-40.

1. A mixture of compounds of the formula $$\begin{array}{c} H_e \\ | \\ CH_2\text{-}[OCH_2CH(CH_3)]_{\overline{x}}NH\text{-}[COC(CH_3)=CH_2]_b \\ H_f \\ | \\ CH_3CH_2CCH_2\text{-}[OCH_2CH(CH_3)]_{\overline{y}}NH\text{-}[COC(CH_3)=CH_2]_c \\ H_g \\ | \\ CH_2\text{-}[OCH_2CH(CH_3)]_{\overline{z}}NH\text{-}[COC(CH_3)=CH_2]_d \end{array}$$

wherein x+y+z has an average value of 3 to 30; b, c, d are 0 or 1; provided, if b=0, e is 1 and conversely e is 0 if b=1; if c=0, f is 1 and conversely f is 0 if c=1; if d=0, g is 1 and conversely g is 0 if d=1; provided, further, at least one of b, c and d must be 1.

3. A compound according to claim 2 wherein b, c and d are 1.

* * * * *

UNITED STATES PATENT AND TRADEMARK OFFICE
CERTIFICATE OF CORRECTION

PATENT NO. : 4,393,237
DATED : July 12, 1983
INVENTOR(S) : Ernest L. Yeakey and Lewis Watts, Jr.

It is certified that error appears in the above-identified patent and that said Letters Patent are hereby corrected as shown below:

In the claims, Column 7, line 52 should read
--1. A compound of the formula -- instead of
"2. A compound according to claim 1 of the formula";
and the formula in lines 54-55 should be $$--CH_2=(CH_3)COC-NHCH(CH_3)CH_2-[OCH_2CH(CH_3)]_xNH-COC(CH_3)=CH_2--$$

instead of $"CH_2=(CH_3)COC-NHCH(CH_3)=CH-_2[OCH_2CH(CH_3)]_xNH-COC(CH_3)=CH_2"$.

In Column 8, line 2, --2.-- should be substituted for "1.".

Signed and Sealed this

Twenty-seventh Day of December 1983

[SEAL]

Attest:

GERALD J. MOSSINGHOFF

*Attesting Officer*    *Commissioner of Patents and Trademarks*